United States Patent
Smollinger

[15] 3,705,445
[45] Dec. 12, 1972

[54] VIBRATION DAMPED FITTING
[72] Inventor: Carl W. Smollinger, 1621 Marlin Ave., Williamsport, Pa. 17701
[22] Filed: Dec. 31, 1969
[21] Appl. No.: 889,381

[52] U.S. Cl. .................................. 24/123, 339/101
[51] Int. Cl. ............................................. F16g 11/00
[58] Field of Search ..... 339/101, 102, 233; 24/123.3, 24/114.5, 123 R, 122.3; 248/58, 358; 287/82, 85, 75

[56] References Cited

UNITED STATES PATENTS

| | | | |
|---|---|---|---|
| 1,871,308 | 8/1932 | Dodge et al. | 24/122.3 |
| 2,211,615 | 8/1940 | Brickman et al. | 24/122.3 |
| 2,680,273 | 6/1954 | Brickman | 24/122.3 |
| 2,700,398 | 1/1955 | Green | 24/115 |
| 2,766,317 | 10/1956 | Woodward | 24/123 |
| 2,945,457 | 7/1960 | Avery et al. | 24/123 |
| 3,238,494 | 3/1966 | Bentley | 339/223 |

OTHER PUBLICATIONS

Tuffy Sling Handbook, pages 58 and 59

Primary Examiner—Bobby R. Gay
Assistant Examiner—Garry Moore
Attorney—Joseph J. O'Keefe

[57] ABSTRACT

A socket type end fitting for wire rope and strand is provided with a plastic cone intimately shaped about the strand adjacent to the fitting to dampen vibrations in the rope.

11 Claims, 8 Drawing Figures

INVENTOR
Carl W. Smollinger

PATENTED DEC 12 1972 3,705,445

INVENTOR
Carl W. Smollinger

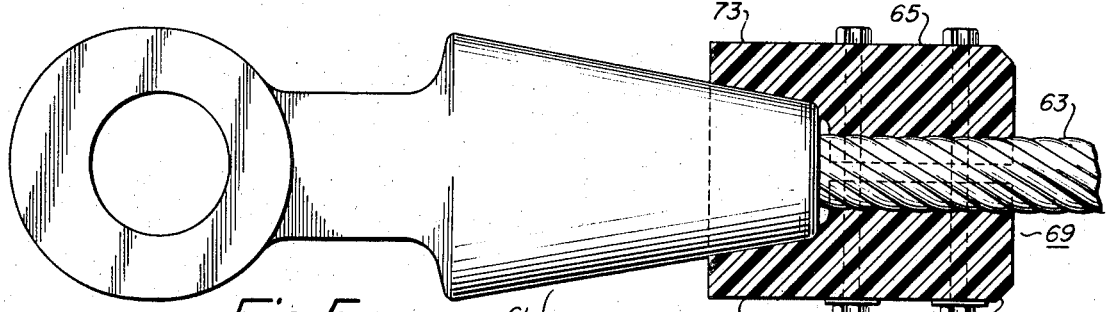
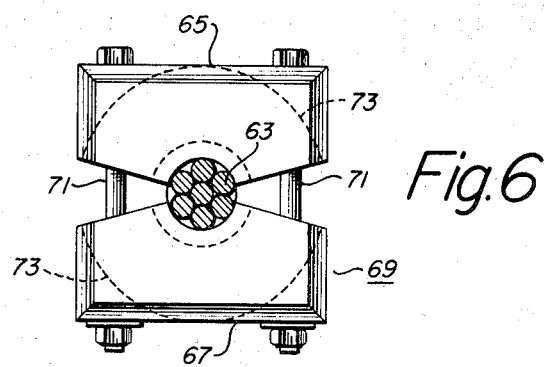
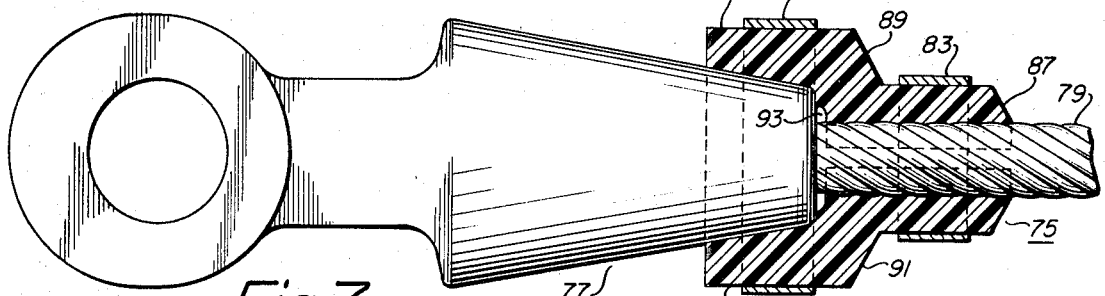
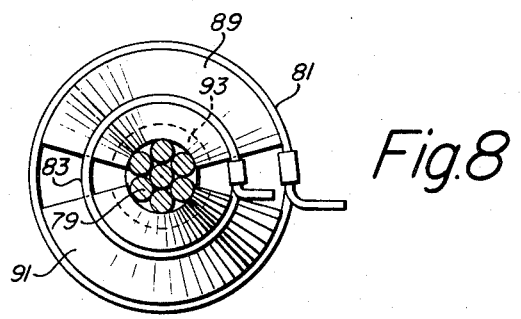
INVENTOR
Carl W. Smollinger

VIBRATION DAMPED FITTING

BACKGROUND OF THE INVENTION

This invention relates to the alleviation of fatigue in wire ropes and strands by means of vibration and particularly to the provision of vibration damping means on a socket type end fitting.

Wire rope and strand subjected to repeated shock and widely fluctuating loads, such as occurs in large earth moving machinery is often subject to premature failure due to wire fatigue. Fatigue of the wires of the strand is particularly liable to occur at or adjacent to fittings mounted on the strand. This is due to the concentration of stress in the strand adjacent the fitting due to repeated torque and sinusoidal vibrations caused by repetitive cycles of loading and unloading.

Various expedients have been resorted to in the past to decrease such vibrations but none to the present inventor's knowledge has been particularly successful with the exception of the damper previously disclosed in the present applicant's application Ser. No. 807,635, filed Mar. 13, 1969.

SUMMARY OF THE INVENTION

In accordance with the invention a metallic end fitting such as a hot metal socket type fitting or a compression type fitting has mounted upon the end thereof and secured or molded in intimate contact with the surface of a cable upon which the fitting is mounted, a plastic damper body preferably in the shape of a cone tapered away from the fitting. This plastic damper body or cone damps out vibrations in the strand and allows the tensional forces in the strand to be evenly transferred into the metallic body of the fitting.

The damper assembly disclosed in application Ser. No. 807,635 is particularly effective with, though not limited to use with, large diameter wire ropes. The applicant's present damper arrangement has been found particularly effective with, though by no means limited to use with, smaller diameter wire ropes.

BRIEF DESCRIPTION OF THE DRAWINGS

FIG. 5 is a view of a modification of the invention.

FIG. 6 is an end view of FIG. 5.

FIG. 7 is a view of a further modification.

FIG. 8 is an end view of FIG. 7.

DESCRIPTION OF THE PREFERRED EMBODIMENTS

Figure 1:
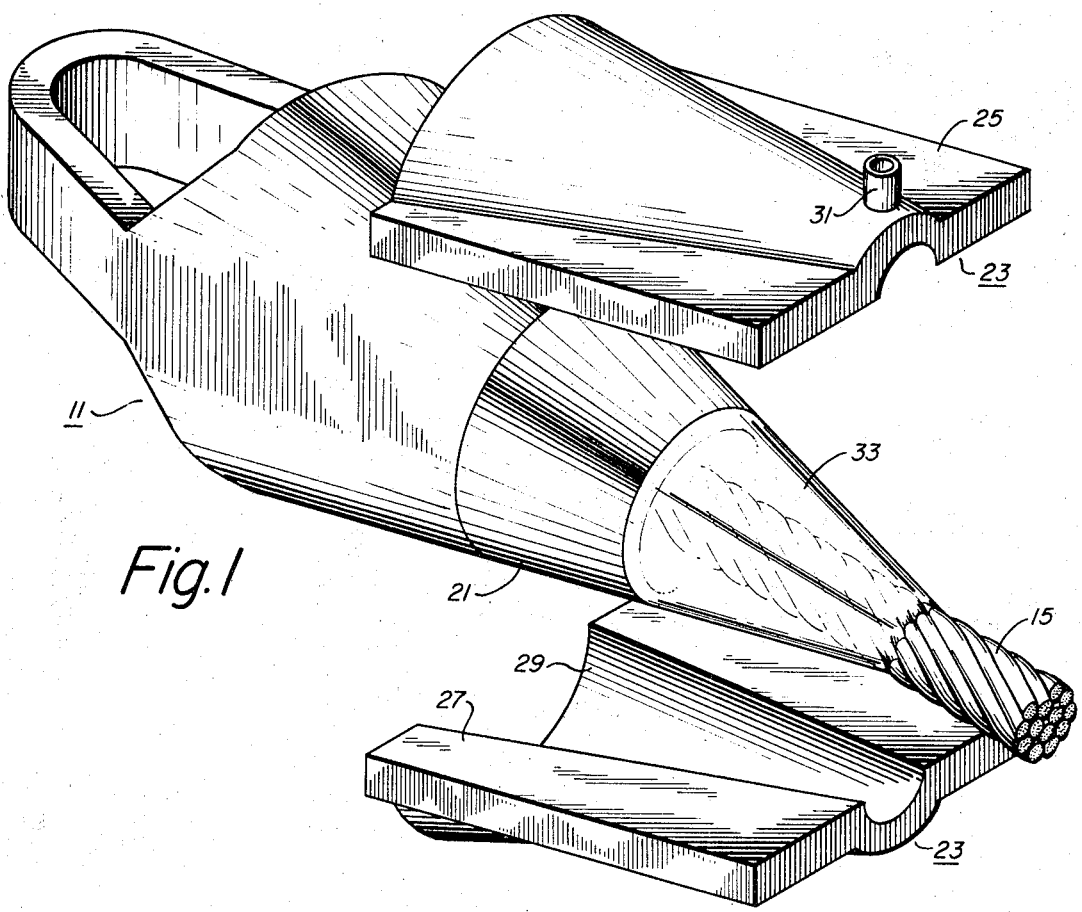
FIG. 1 is an isometric view of a fitting according to the present invention and an accompanying split mold shown exploded for clarity.
Figure 2:
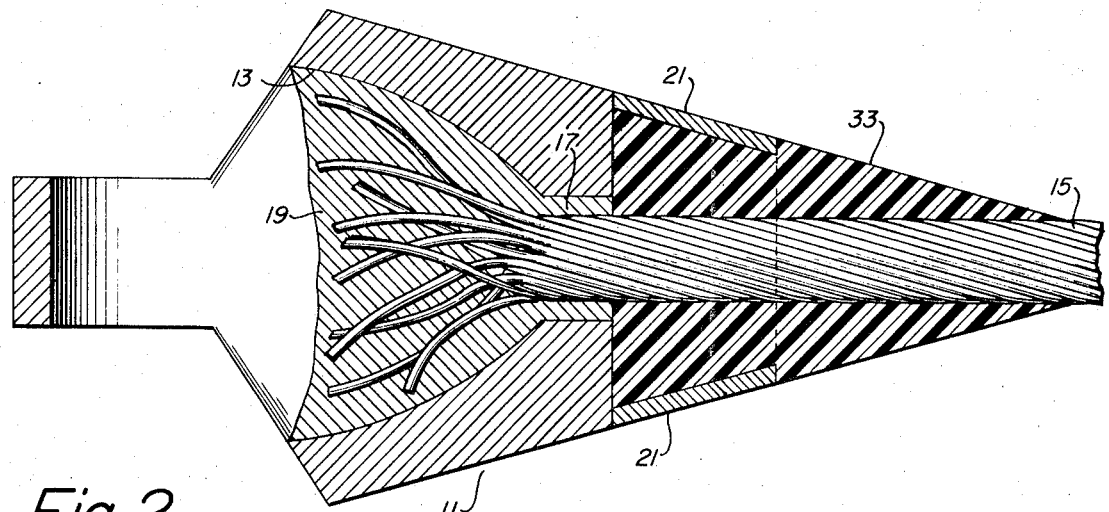
FIG. 2 is a longitudinal cross-section through the fitting shown in FIG. 1.

A zinc socket type end fitting 11 is shown in FIGS. 1 and 2. As well understood in the art this fitting has a bowl 13 at one end into which a wire rope or strand 15 is inserted through an orifice 17 in the bottom of the fitting. The individual wires or strands of the strand or rope 15 are partially unlaid and broomed outwardly within the bowl and molten zinc or other suitable molten metal 19 is poured into the bowl around the wires or strands and allowed to solidify.

A flange 21 is positioned on the bottom of socket 11 preferably inclined inwardly toward the strand 15 to form a hollow frustum. Flange 21 is preferably formed as an integral portion of the socket 11 but may, if desired, be welded onto the socket.

After the strand or rope 15 is fixed in the socket 11 the lower portion of the socket is placed within a conical mold 23 which is preferably made in two sections 25 and 27 as shown in partial exploded view in FIG. 1. The two sections 25 and 27 of the mold fit over the flange 21 and define a conical internal mold chamber 29 into which a molten thermoplastic or a thermosetting plastic is poured through orifice 31.

Any suitable plastic which is firm, resilient, tough, shock resistant and preferably transparent may be used. A polyurethane plastic has been found particularly suitable. The hardness of the plastic should be between 70 and 95 on the Durometer A scale and will preferably have a hardness of between 80 and 92 on the Durometer A scale. Durometer scale A is substantially identical to the well known Shore A scale and readings on both scales are interchangeable.

After the plastic has solidified or set the mold 23 is removed leaving a conical plastic damper 33 firmly locked to the strand or rope and extending away from the bottom of the fitting. This plastic damper 33 absorbs vibrations in the strand by smoothing them out and allowing the tension of the strand to be evenly transferred to the body of the fitting.

As a modification of the method of forming the conical damper 33 a thermoplastic cone having a central orifice larger than the diameter of the strand or rope and outside dimensions greater than the final dimensions of the conical damper can be placed over the rope or strand and then forced partially down within the flange 21. After being positioned the cone may be enclosed in a heated mold which will soften the plastic of the cone and enable it to be firmly forced into locking engagement with the flange 21 and firmly molded about strand or rope 15. The initial thermoplastic cone may be split lengthwise in order to facilitate its placement about the strand.

Figure 3:
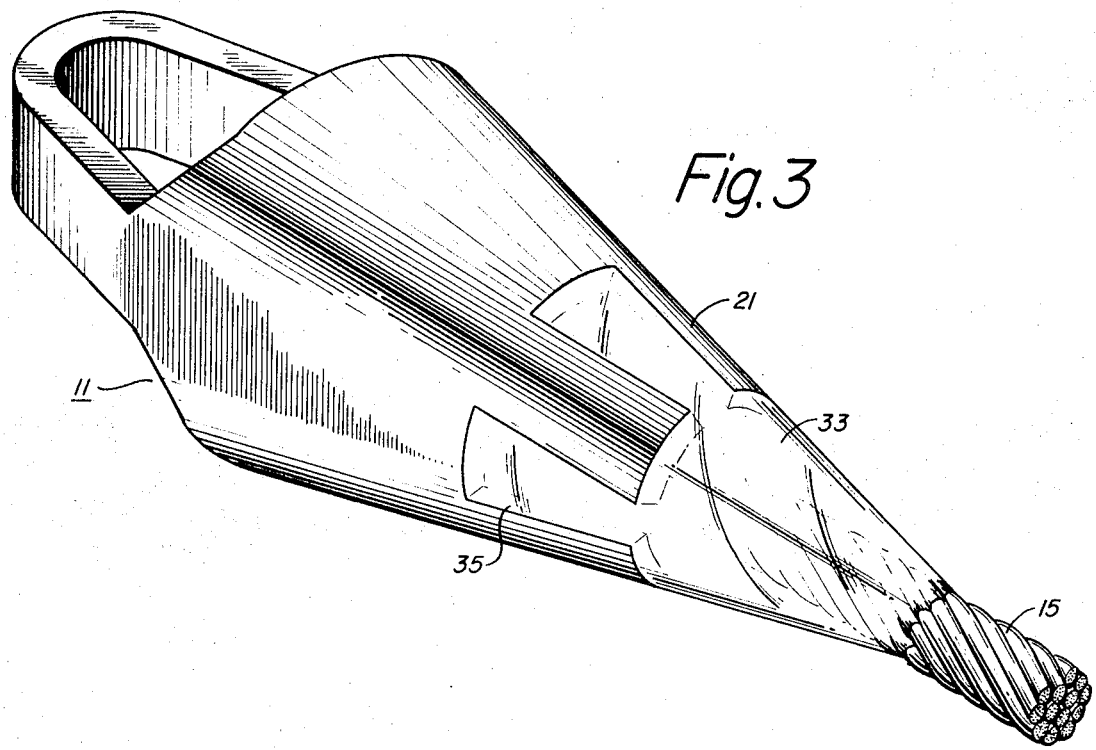
FIG. 3 is a modification of the fitting shown in FIG. 1.

FIG. 3 shows a modification of the damper arrangement in which flange 21 is discontinuous, or has orifices 35 in it, so that the strand 15 can be periodically inspected through the transparent plastic to detect any damage to the portion of the strand entering the bottom of the socket.

Figure 4:
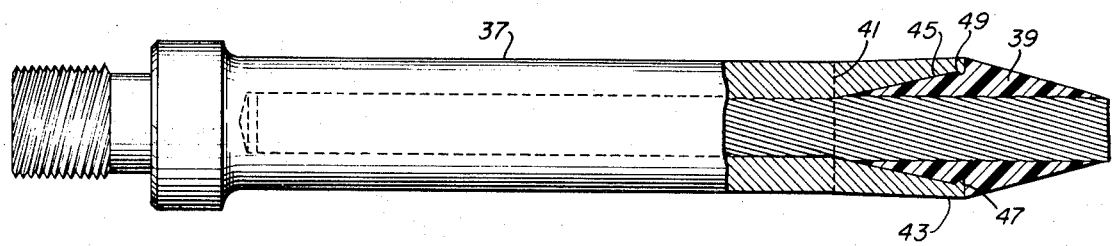
FIG. 4 is a cross-section through a compression type fitting according to the present invention.

FIG. 4 is a cross-section through a compression type end fitting having a body portion 37 firmly compressed by swaging or the like upon the end of a strand and a conical plastic damper 39 firmly molded to the strand and extending away from the bottom of the body of the fitting. The compression fitting is adapted to be secured to the strand by force applied over most of the body of the fitting up to dotted line 41 but not over the terminal end 43 of the fitting. The terminal end 43 of the compression fitting beyond dotted line 41 has an initial slight internal taper which is outwardly inclined prior to compression. When body portion 37 is compressed by swaging or other equivalent force the terminal end 43, which is not compressed, flares outwardly still further providing a tapered opening 45 between the strand and the terminal end 43. If desired a slight inward curvature or bead 47 may be provided around the inner lip 49 of the terminal end 43. When the plastic cone 39 is subsequently molded over the strand in the same manner as shown in FIGS. 1 and 2 for a hot metal type socket i locks intimately with the surface irregularities of the strand and is wedged between the outwardly flared terminal end 43 of the swaged fitting and the strand. Since the strand and the plastic cone 39 is also molded or locked intimately to the strand the cone and the fitting are firmly secured together in intimate contact with each other through the strand even though the opening 45 is tapered outwardly. Bead 47 if present also aids in locking the cone 39 to the compression fitting. As vibrations in the strand arrive at the plastic cone their amplitude is decreased and their energy dissipated in flexing and compressing the cone before the vibrations are passed on to the fitting with decreased energy and amplitude.

For emergency field application it may often be satisfactory if two halves of a plastic body or cone with a half round central groove are placed around the strand adjacent to and preferably tightly butting a fitting and clamped securely to the strand in intimate contact therewith by any suitable clamping means. In this arrangement the fitting and the plastic cone are both locked to the strand and thus securely fastened to each other through the strand. Preferably the plastic damper body will also be clamped to the nose of the fitting. Considerable vibration is thus absorbed by the plastic cone before reaching the fitting and fatigue of the strand wires near the fitting is considerably reduced. While this embodiment of the invention is not nearly as efficient an arrangement as having the plastic cone intimately molded to the strand it may at times be useful for emergency field application, particularly where the fatigue life of the rope or strand need not be greatly prolonged because the strand is exposed to other deleterious conditions which will cause accelerated failure in any event.

Temporary plastic damper bodies suitable for field application are shown in FIGS. 5 and 6, 7 and 7 and 8. In FIGS. 5 and 6 a conventional molten zinc socket 61 has been previously secured to a strand 63. Two halves 65 and 67 of a plastic damper body 69 formed from a polyurethane plastic and preferably having a hardness on the Durometer A scale of from approximately 90 to 95 have then been secured by bolts 71 about the strand 63 adjacent to socket 61 with flanges 73 extending over and around the nose of the socket in intimate contact therewith. The two halves 65 and 67 of the plastic damper body 69 must be firmly secured to the surface of the strand 63 by tension in the bolts 71. Preferably the inner surfaces of the damper body contacting the strand will be previously contoured to conform to the helical surface of the strand. Flanges 73 are rounded in contour so that a commercial type strapping or the like may be placed about the flanges to clamp them to the nose of the fitting if necessary to obtain an intimate contact between fitting 61 and damper body 69.

In FIGS. 7 and 8 there is shown a second embodiment of a temporary plastic damper body 75 secured about a zinc socket fitting 77 and a strand 79 by means of straps 81 and 83 applied over flange section 85 and nose 87 of two halves 89 and 91 of plastic damper body 75. A small opening 93 may be formed within the plastic damper body adjacent the nose of the fitting to contain lubricant.

While it would be desirable if the temporary plastic damper bodies 69 and 75 were conical in shape they need not be because they are intended to be temporary expedients only and cannot be expected in any event to delay fatigue in the wires of the strand for extended periods. Ease of fabrication and application to the strand in the field may thus outweigh other design considerations. In environments where fatigue occurs very quickly as in some large shovel and crane strands it may be sufficient if by the application of the dampers in the field the strand lasts two weeks or more rather than only a week. A conical damper body intimately molded about the strand as in FIGS. 1 through 4 on the other hand might preserve the strand under the same conditions for as much as a month or more. In each case transverse vibrations in the strand are imparted to the plastic damper body as they progress towards the fitting and are passed on to the fitting with very materially reduced amplitude and energy due to the vibration absorption properties of plastic material having the correct hardness and resiliency properties.

I claim:

1. An end fitting for a wire cable subject to destructive vibrations while tensioned during use comprising:
    a. a first metallic body portion of said fitting secured upon the end of a wire cable, and
    b. a second elongated plastic damper body portion comprised of a substantial body of plastic material positioned immediately adjacent to the said first body portion in the direction of the axis of the said cable and in intimate contact with said first metallic body portion; said second plastic damper body extending beyond said first metallic body portion along the cable for a distance substantially less than the length of the cable in intimate circumferential contact with the peripheral surface of the wire cable and the component peripheral wires thereof and comprising a stiff resilient plastic material selected from the group consisting of thermoplastic and thermosetting resins.

2. An end fitting for a wire cable subject to destructive vibrations while tensioned during use comprising:
    a. a first metallic body portion of said fitting secured upon the end of a wire cable,
    b. a second elongated plastic damper body portion of said fitting comprised of a substantial body of plastic material positioned immediately adjacent to the said first body portion in the direction of the axis of the said cable and in intimate contact with said first metallic body portion; said second plastic damper body extending away from said first metallic body portion along the cable in intimate circumferential contact with the peripheral surface of the wire cable and the component peripheral wires thereof and comprising a firm resilient plastic material selected from the group consisting of thermoplastic and thermosetting resins, and
    c. plastic gripping means attached to said first body portion to firmly secure the second plastic damper body to the said first metallic body portion.

3. An end fitting according to claim 2 wherein the portion of the second plastic damper body of (b) extending along the cable is comprised of a plastic having a Durometer A hardness of 70 to 95.

4. An end fitting according to claim 3 wherein the outer surface of the portion of the second plastic damper body of (b) extending along the cable is significantly tapered in a direction away from said body portion.

5. An end fitting according to claim 4 wherein the outer surface of the portion of the second plastic damper body of (b) extending along the cable is generally conical in shape.

6. An end fitting according to claim 5 wherein the outer portion of the second plastic damper body of (b) is comprised of a plastic having a Durometer A hardness of 80 to 92.

7. An end fitting according to claim 6 wherein the plastic gripping means of (c) comprises an annular flange secured to said first metallic portion arranged to effectively surround a section of said second plastic body portion adjacent to said first metallic body portion to securely attach the two portions together.

8. An end fitting according to claim 7 wherein the first metallic body portion of (a) comprises a hot metal type socket.

9. An end fitting according to claim 4 wherein the first metallic body portion of (a) comprises a compression type fitting.

10. An end fitting according to claim 9 wherein the portion of the second plastic body portion of (b) extending along the cable is comprised of a plastic having a Durometer A hardness of 80 to 92.

11. An end fitting according to claim 8 wherein the plastic comprising the section of the second plastic damper body of (b) surrounded by said annular flange is at least partly transparent and the annular flange is discontinuous.

* * * * *